United States Patent
Cippitelli

(10) Patent No.: US 6,962,097 B2
(45) Date of Patent: Nov. 8, 2005

(54) MECHANICAL STEERING TRANSMISSION UNIT

(76) Inventor: Sante Cippitelli, Contrada San Gualtiero, I-63029 Servigliano (AP) (IT)

( * ) Notice: Subject to any disclaimer, the term of this patent is extended or adjusted under 35 U.S.C. 154(b) by 78 days.

(21) Appl. No.: 10/474,394

(22) PCT Filed: Feb. 22, 2002

(86) PCT No.: PCT/IT02/00109

§ 371 (c)(1),
(2), (4) Date: Oct. 7, 2003

(87) PCT Pub. No.: WO02/083481

PCT Pub. Date: Oct. 24, 2002

(65) Prior Publication Data

US 2004/0159182 A1    Aug. 19, 2004

(30) Foreign Application Priority Data

Apr. 12, 2001 (IT) .......................... MC2001A0042

(51) Int. Cl.⁷ ........................... F16H 48/12; F16H 3/22
(52) U.S. Cl. ........................... 74/650; 74/347; 74/397; 74/665 R
(58) Field of Search .......................... 74/347–349, 351, 74/397–403, 650, 661, 665 R, 665 L, 665 M, 74/721

(56) References Cited

U.S. PATENT DOCUMENTS

| | | | | | |
|---|---|---|---|---|---|
| 2,336,912 | A | * | 12/1943 | Zimmerman | ................. 475/23 |
| 3,115,936 | A | * | 12/1963 | Blews, Jr. | .................. 416/120 |
| 3,566,714 | A | * | 3/1971 | Borello | ........................ 74/661 |
| 3,851,614 | A | * | 12/1974 | Nelson | ........................ 440/63 |
| 4,270,408 | A | * | 6/1981 | Wagner | ........................ 74/661 |
| 4,344,760 | A | * | 8/1982 | Kulikowski | ..................... 440/3 |
| 4,411,170 | A | * | 10/1983 | Vogelgesang | ................ 74/661 |
| 4,470,284 | A | * | 9/1984 | Noe' et al. | .................... 72/248 |
| 4,700,589 | A | * | 10/1987 | Coronel | ......................... 475/6 |
| 4,783,023 | A | * | 11/1988 | Jupe | .............................. 244/6 |
| 5,040,429 | A | * | 8/1991 | Del Castillo | ................. 74/424 |
| 5,142,942 | A | * | 9/1992 | Fukaya | ......................... 74/650 |

* cited by examiner

*Primary Examiner*—Tisha Lewis
(74) *Attorney, Agent, or Firm*—Armstrong, Kratz, Quintos, Hanson & Brooks, LLP

(57) ABSTRACT

The present invention concerns a mechanical steering transmission unit comprising an input drive shaft and two output driven shafts that can revolve in the same or opposite direction at the same speed.

2 Claims, 1 Drawing Sheet

MECHANICAL STEERING TRANSMISSION UNIT

FIELD OF THE INVENTION

The present application for industrial patent concerns a mechanical transmission unit especially designed for vehicles running on wheels or belts. This unit will allow the vehicle to turn around an imaginary point placed between the couple of belts or wheels without stopping.

Since the mechanism of the invention was developed with the specific aim of solving a typical problem of caterpillars, henceforth the present description will refer to this type of vehicles. However, any vehicle running on four wheels and machines in general can equally benefit from using the mechanism.

BACKGROUND OF THE INVENTION

As it is known, the easiest way to make a caterpillar turn is to brake the belt on the internal side of the curve and block it down completely. The technique is employed to make the vehicle turn on itself using one of the belts as pivot.

It is evident, however, that using this technique it will be impossible to make the caterpillar turn around an imaginary point placed between the lateral course of belts. As it is often the case for some models of highly sophisticated combat tanks, when such a performance is required, the tanks are equipped with special hydraulic transmission units, which employ two hydraulic motors (one for each belt). When needed, the motors start revolving in opposite direction. In this way the centre of curvature of the vehicle falls inside the lateral couple of belts.

It must be stressed, however, that in these cases this performance (that is to make the motors run in the opposite direction) cannot be achieved without having previously stopped the run of the vehicle. This means that it is not possible to make the vehicle turn on itself without previously stopping its straight run.

OBJECT OF THE INVENTION

The aim of the invention is to invent a mechanical transmission unit with two output driven shafts that, when needed, will allow the counter-rotation of the two output shafts. If the aforementioned shafts drive the belts of the caterpillar, a rotation of the caterpillar on itself will correspond to this counter-rotation.

An additional aim of the invention is to develop a mechanical transmission unit with two output driven shafts that will allow the counter-rotation of the two output shafts without stopping them, when needed.

BRIEF DESCRIPTION OF THE DRAWING

In order to avoid any misunderstanding, the description of the transmission unit of the invention will proceed with reference to the enclosed drawing. However, the drawing has the only purpose of illustrating the invention and is not binding in any way. Therefore.

DESCRIPTION OF THE PREFERRED EMBODIMENTS

Figure 1:
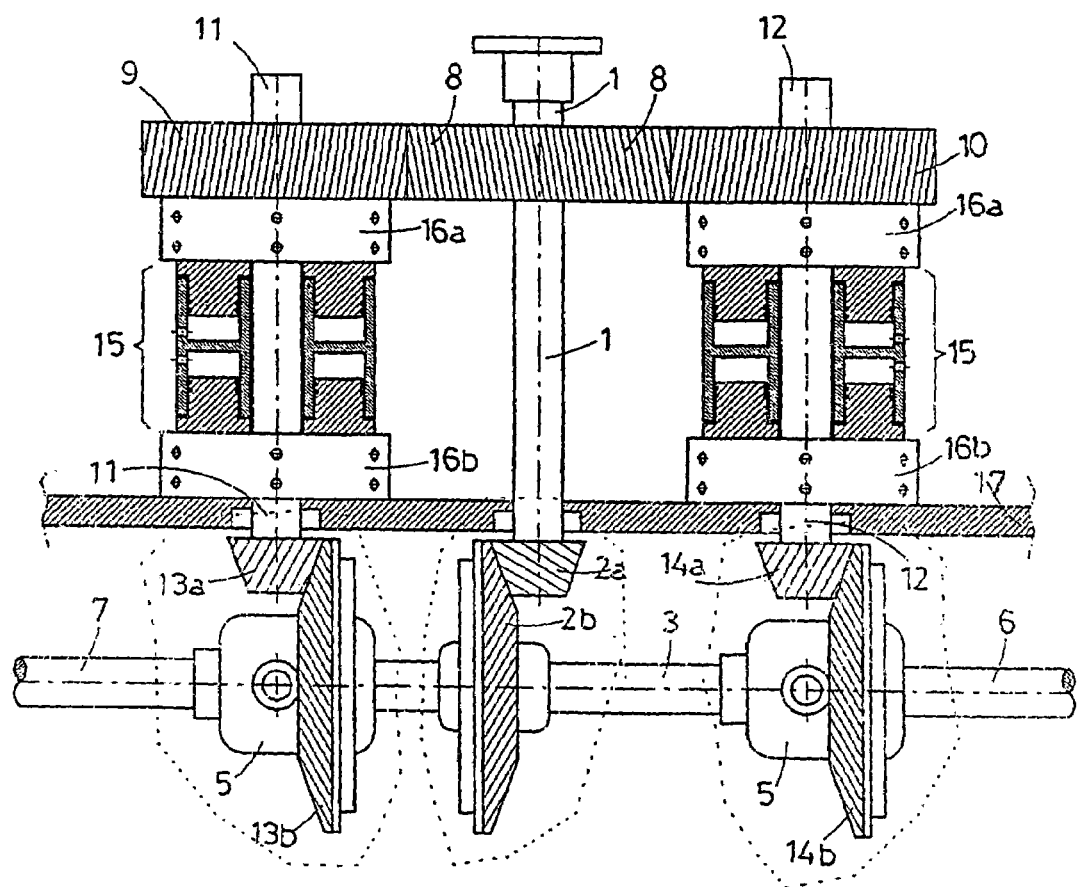
FIG. 1 is a cross sectional view which only shows a possible representation of the transmission unit of the invention.

With reference to the aforementioned figure, the transmission unit of the invention includes a drive shaft (1) that, by means of a couple of bevel gears (2a and 2b), drives a driven shaft (3) at whose ends two identical differential gears (5) are mounted from which two driven shafts (6 and 7) can drive the belts or wheels of the vehicle.

What is claimed is:

1. A mechanical transmission unit, having an input drive shaft (1) and two output driven shafts (6 and 7) that comprises:

a first pair of bevel gears having a first bevel gear (2a) and a second bevel gear (2b), the first bevel gear being splined to the drive shaft (1), the second bevel gear (2b) being splined to a driven shaft (3), that is at right angle to the drive shaft (1); at the ends of the driven shaft (3), two identical differential units (5) are installed, from which the two output driven shafts (6 and 7) originate, a cogwheel (8) that is splined to the drive shaft (1) and gears with a couple of cogwheels (9 and 10) that are identical to the cogwheel (8), each of which is splined to the another pair of driven shafts (11 and 12), which are parallel and whose opposite sides lie near the drive shaft (1), a second pair of bevel gears (13a and 13b) and a third pair of bevel gears (14a and 14b), which lie near the opposite sides of the first pair of bevel gears (2a and 2b) and are used to link differential gears (5) to their the another pair of driven shafts (11 and 12);

two identical hydraulic units (15) respectively mounted on the another pair of driven shafts (11 and 12), each of them used to start two antithetical clutches (16a and 16b), the former (16a) controls transmission of motion from the two cogwheels (9 and 10) to their respective driven shafts (11 and 12); whereas the second clutch (16b) prevents the free rotation of a frame (17) and the another pair of driven shafts (11 and 12), making them revolve in the same direction;

it is also being provided that the three pairs of bevel gears (2a and 2b; 13a and 13b; 14a and 14b) are perfectly identical;

the first bevel gear of the first pair (2b) is splined to the driven shaft (3) and lies upside down with reference to the two bevel gears (13b and 14b) of the second and third pair.

2. A-transmission unit according to claim 1, wherein the two output drivin shafts (6 and 7) are parallel and coaxial.

* * * * *

UNITED STATES PATENT AND TRADEMARK OFFICE
CERTIFICATE OF CORRECTION

PATENT NO. : 6,962,097 B2
APPLICATION NO. : 10/474394
DATED : November 8, 2005
INVENTOR(S) : Sante Cippitelli It is certified that error appears in the above-identified patent and that said Letters Patent is hereby corrected as shown below:

In column 2, after line 15 and before line 16, insert the following:

A cogwheel has been splined to the drive shaft (1). The cogwheel (8) gears with a couple of cogwheels (9 and 10). The cogwheels (9 and 10) lie opposite the cogwheel (8), are identical to cogwheel (8) and splined to the drive shafts (11 and 12), which are parallel and lie opposite the drive shaft (1).

The two driven shafts (11 and 12) are linked to two differential gears (5) by means of two couples of bevel gears (13a and 13b) and (14a and 14b) that lie near the opposite sides of the aforementioned couple of bevel gears (2a and 2b).

It is important to stress that the three couples of bevel gears (2a and 2b) (13a and 13b) and (14a and 14b) are identical.

Since the driven shafts (11 and 12) revolve in the opposite direction of the drive shaft (1), the bevel gear (2b) splined to the shaft (3) lies upside down with reference to the two bevel gears (13a and 14b) in order to make the revolving direction of the shaft (3) the same as the other two shafts (6 and 7).

Finally, it must be stressed that two identical hydraulic units (15) are mounted on each of the shafts (11 and 12) and drive two antithetical clutches (16a and 16b). The former (16a) controls transmission of motion from cogwheels (9 and 10) to the driven shafts (11 and 12) whereas the latter (16b) prevents the free rotation of the frame (17) and driven shafts (11 and 12), making them revolve in the same direction.

Following is a description of how the transmission unit of the invention will perform when mounted on a motor-vehicle.

When the vehicle runs in straight direction, the clutches (16a) are geared in, whereas clutches (16b) are not. In this case the shafts (11 and 12) revolve with the same number of revolutions as the drive shaft (1). In addition to this, since the differential gears (5) are not performing because the three bevel gears (2b, 13b and 14b) revolve with the same number of revolutions, the output shafts (6 and 7) revolve in the same direction and with the same number of revolutions as the central shaft (3).

UNITED STATES PATENT AND TRADEMARK OFFICE
CERTIFICATE OF CORRECTION

PATENT NO. : 6,962,097 B2
APPLICATION NO. : 10/474394
DATED : November 8, 2005
INVENTOR(S) : Sante Cippitelli It is certified that error appears in the above-identified patent and that said Letters Patent is hereby corrected as shown below:

When the vehicle has to turn on itself around an imaginary vertical axis placed between its opposite couple of belts or wheels, one of the two hydraulic units (15) must be started. This will ungear the geared clutch (16a) and will gear the proper clutch (16b). In this way, the driven shaft (11 and 12) – depending on the hydraulic unit that has been started (15) – will stop since it is no longer driven by the cogwheel (9 or 10) and it is blocked to the frame (17) by clutch (18b).

Consequently, the differential gear (5) of one of the two bevel gears (13a and 14a) that cannot revolve because its shaft (11 or 12) has ceased to revolve will start to perform.

The performance of one of the two differential gears (5) produces a reversal in the revolution direction of the two output shafts (6 and 7), which, however, continue on revolving with the same number of revolutions.

It appears now evident how to use of the invention makes it possible to make the vehicle switch from running straight to turning on itself without having to stop the vehicle to switch from a mode (straight run) t the other (turning).

Finally, it is important to stress that by suitably acting on the hydraulic units (15), it is also possible to determine the variation in the turning direction of the vehicle and the number of revolutions of the output shafts (6 and 7), thus changing the vehicle's turning circle.

Signed and Sealed this

Twenty-second Day of August, 2006

JON W. DUDAS
*Director of the United States Patent and Trademark Office*